United States Patent [19]
Pittman et al.

[11] Patent Number: 5,788,216
[45] Date of Patent: *Aug. 4, 1998

[54] VALVE WITH PERFLUOROELASTOMER PACKING

[75] Inventors: Gary Mack Pittman, Pearland, Tex.; Kenneth Alan Senior, Wilmington, Del.; John Neal Strunk, Houston, Tex.; Krishnan Ramalingam Thondukolam, Newark, Del.

[73] Assignee: E. I. du Pont de Nemours and Company, Wilmington, Del.

[ * ] Notice: The term of this patent shall not extend beyond the expiration date of Pat. No. 5,549,276.

[21] Appl. No.: 640,611

[22] Filed: May 1, 1996

Related U.S. Application Data

[63] Continuation of Ser. No. 88,015, Jul. 6, 1993, Pat. No. 5,549,276, which is a continuation-in-part of Ser. No. 905,581, Jun. 29, 1992, abandoned, and Ser. No. 904,756, Jun. 29, 1992, abandoned, each is a continuation-in-part of Ser. No.649,543, Jan. 24, 1991, abandoned, and Ser. No. 649,541, Jan. 24, 1991, abandoned.

[51] Int. Cl.$^6$ ..................................................... F16K 41/04
[52] U.S. Cl. .......................... 251/214; 277/532; 277/536; 277/540; 277/937; 277/938; 277/945
[58] Field of Search .................................. 251/214; 277/105, 277/123, 124, 125, DIG. 6, 511, 531, 532, 536, 540, 937, 938, 945

[56] References Cited

U.S. PATENT DOCUMENTS

| | | | |
|---|---|---|---|
| 3,003,797 | 10/1961 | Gage | 277/125 |
| 3,284,089 | 11/1966 | Wrenshall | 251/214 |
| 3,467,394 | 9/1969 | Bryant | 251/214 |
| 3,472,485 | 10/1969 | Smith | 251/214 |
| 3,916,943 | 11/1975 | Hester et al. | 251/214 |
| 4,061,157 | 12/1977 | Hanssen | 251/214 |
| 4,192,519 | 3/1980 | Buggele | 277/124 |
| 4,214,761 | 7/1980 | Pippert | 277/123 |
| 4,234,197 | 11/1980 | Amancharla | 277/125 |
| 4,281,092 | 7/1981 | Breazeali | 526/247 |
| 4,283,062 | 8/1981 | Catanzaro et al. | 277/124 |
| 4,364,542 | 12/1982 | Meyer | 277/124 |
| 4,406,469 | 9/1983 | Allison | 277/123 |
| 4,433,847 | 2/1984 | Weinberg | 277/125 |
| 4,473,231 | 9/1984 | Tilton et al. | 277/124 |
| 4,512,586 | 4/1985 | Smith | 277/124 |
| 4,527,806 | 7/1985 | Ungchusri et al. | 277/124 |
| 4,572,519 | 2/1986 | Cameron et al. | 277/124 |
| 4,576,385 | 3/1986 | Ungchusri et al. | 277/124 |
| 4,630,636 | 12/1986 | Cutcher | 251/214 |
| 4,634,197 | 1/1987 | Amanchacta | 277/DIG. 6 |
| 4,811,959 | 3/1989 | Bullard | 277/124 |
| 4,826,181 | 5/1989 | Howard | 277/112 |
| 4,886,241 | 12/1989 | Davis et al. | 277/124 |
| 5,056,757 | 10/1991 | Wood | 251/214 |
| 5,131,666 | 7/1992 | Hulchens | 277/124 |
| 6,406,469 | 9/1983 | Allison | 277/DIG. 6 |

FOREIGN PATENT DOCUMENTS

| | | |
|---|---|---|
| 1001698 | 8/1965 | United Kingdom . |
| 1413697 | 12/1993 | United Kingdom . |

OTHER PUBLICATIONS

Kalrez® Valve Stem Packing (KVSP).
E. I. du Pont de Nemours and Co., Kalrez® Perfluoroelastomer Parts: Technical Guidelines and Design Information For Using Kalrez® in Fugitive Emission and Other Related V–Ring Packing Systems, pp. 1–8.
Kuliez® Valve Stem Packing, Dupont Publication (No Date Available).

*Primary Examiner*—George L. Walton

[57] ABSTRACT

Valves having a stem packing of alternating layers of perfluoroelastomer and high temperature polymer provide outstanding sealing performance against corrosive fluids and high temperatures.

14 Claims, 2 Drawing Sheets

VALVE WITH PERFLUOROELASTOMER PACKING

CROSS-REFERENCE TO RELATED APPLICATIONS

This is a continuation of application Ser. No. 08/088,015, filed Jul. 6, 1993, now U.S. Pat. No. 5,549,276 which is a Continuation-in-Part of applications Ser. Nos. 07/905,581 and 07/904,756, both filed Jun. 29, 1992, now abandoned, which are, respectively, Continuations-in-Part of applications Ser. Nos. 07/649,543 and 07/649,541, both filed Jan. 24, 1991, now abandoned.

BACKGROUND OF THE INVENTION

Valves used in industrial environments often have rigorous performance standards. In the past, packings of polytetrafluoroethylene and other fluoropolymers have been used which were considered to seal valves satisfactorily. While packings were previously considered satisfactory with leakages of 10,000 ppm, such levels have now been found to be unacceptable for many applications. Desired emission levels for many industrial applications are below 500 ppm, and levels of less than 10 ppm for particularly toxic and carcinogenic materials would be desirable, particularly for those materials for which emission or handling standards have been established by various governmental agencies.

Current requirements for valve sealing have created a need for packing systems that exceed earlier performance requirements in a cost-effective manner.

SUMMARY OF THE INVENTION

The present invention provides a valve having a packing which can reduce valve emissions to levels previously unattainable without precision metal bellows components.

Specifically, the present invention provides, in a valve having a body, adjusting stem within the body and a packing around the stem, the improvement wherein the packing comprises least three rings, including (a) a male adapter, (b) a female adapter, and (c) at least one perfluoroelastomer chevron seal ring positioned between the male adapter and the female adapter, each such perfluoroelastomer chevron seal ring being pointed toward the atmospheric end of the packing.

DETAILED DESCRIPTION OF THE INVENTION

Figure 2:
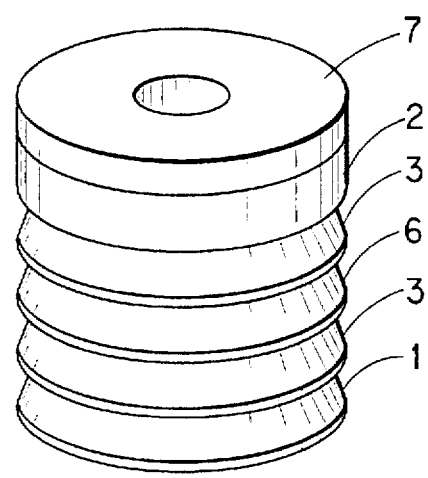
FIG. 2 is a perspective view of a preferred valve packing which can be used in the valves of the present invention.
Figure 3:
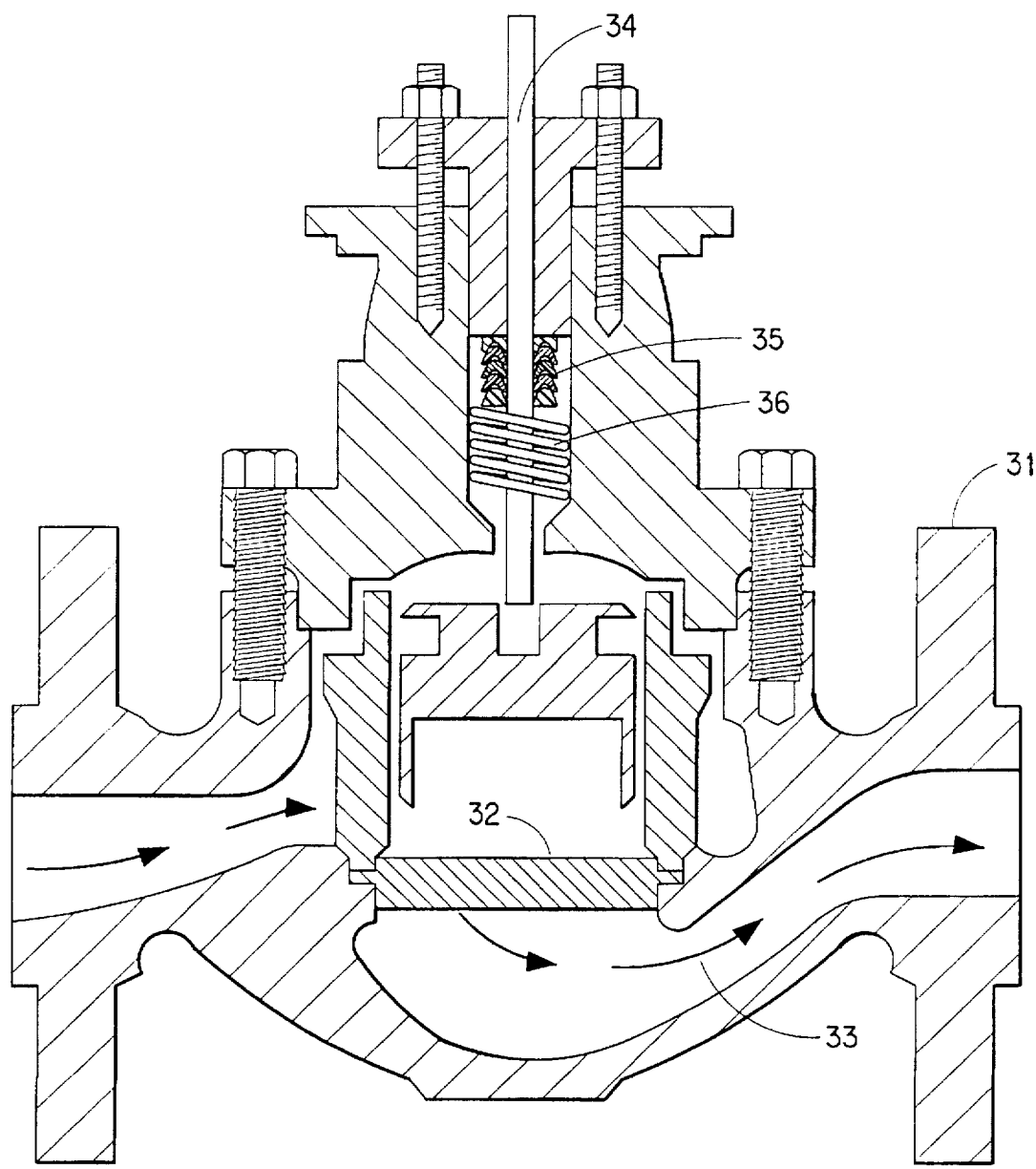
FIG. 3 is a cross-sectional view of a valve according to the present invention.

The valves of the present invention are of the type typically used to regulate the flow of fluids, and comprise, as shown in FIG. 3, a body 31, gate means 32 for adjusting the flow of fluid 33 stream, and adjusting stem 34, operationally connected with the gate means. Typical gate means which can be used are globes, balls, and butterflies, each on an appropriate mating surface. The adjusting stem is surrounded by valve packing 35, which is more fully illustrated in FIGS. 1 and 2. The packing is live loaded, as by spring 36 shown in FIG. 3. In the alternative, external loading can be used, such as Belleville disc springs.

Figure 1:
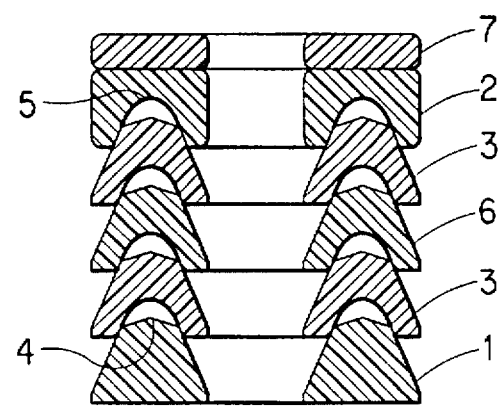
FIG. 1 is a cross-sectional view of a valve packing which can be used in the valves of the present invention.

The valve packings which can be used in the valves of the present invention are composed of a plurality of individual rings, as can be seen in cross-sectional illustration in FIGS. 1 and 2. There, male adapter 1 is at the upstream end of the packing, and female adapter 2 is at the atmospheric, or downstream end of the packing. Perfluoroelastomeric seal rings 3 are in a chevron or "V" configuration, fitting with ridge 4 of the male adapter and groove 5 of the female adapter, the point of the "V" being directed toward the atmospheric end of the packing.

When two or more seal rings are used in the packings of the present invention, the seal rings are separated by spacer rings 6. These spacer or backup rings can be prepared from the same or different materials as the male and female adapters. The particular material should be adapted to the conditions of use that the packing will experience. High temperature polymeric resins, that is, those stable at temperatures of at least about 500° F., are preferred, such as substantially non-elastomeric fluoropolymers or polyetheretherketones.

Fluoropolymers which can be used for this component include polytetrafluoroethylenes, such as those commercially available from the Du Pont Company as Teflon® TFE fluoropolymer resins; melt-processable copolymers of tetrafluoroethylene and hexafluoropropylene such as those commercially available from the Du Pont Company as Teflon® FEP fluoropolymer; and clear, thermoplastic fluoropolymers such as those tetrafluoroethylene/fluorovinylether copolymers commercially available from the Du Pont Company as Teflon® PFA flouropolymer resin. Still other fluoropolymers which can be used effectively in the present invention are those modified copolymers of ethylene and tetrafluoroethylene commercially available from the Du Pont Company as Tefzel® ETFE flouropolymer resin. Polyetheretherketones which can be used include those commercially available from ICI as PEEK.

Perfluoroelastomers which can be used in the preparation of the seal rings of the present invention include, for example, those perfluoroelastomers described in Breazeale, U.S. Pat. No. 4,281,092. Perfluoroelastomers of tetrafluoroethylene and perfluoro (methyl vinyl ether) are commercially available from the Du Pont Company as Kalrez® perfluoroelastomers. These perfluoroelastomers generally have a termonomer to facilitate curing, such as $CF_2=CF-O-CF_2-CF(CF_3)-O-C_6F_5$, $CH_2=CH-CF_2-CF_2Br$, $CF_2=CF-O-CF_2CF(CF_3)OCF_2CF_2CN$, and $CF_2=CH_2$.

Other perfluoroelastomers which can be used are those copolymers of tetrafluoroethylene and a mixture of perfluoromethylvinyl ether and higher molecular vinyl ether, and having a cure site monomer derived from perfluoro alkyl diodide. Those copolymers are commercially available from Daikin Kogyo Co., Ltd. as Perfluor® perfluoroelastomer, and marketed by Green, Tweed as Chemraz® perfluoroelastomer. Still another perfluoroelastomer which can be used in the present invention is that commercially available from NOK-Freudenberg as Simraz® perfluoroelastomer.

The perfluoroelastomers used in the present invention can exhibit full elastomeric behavior, that is, the perfluoroelastomers exhibit an elongation at break of at least about 100%, and preferably at least about 125%. To attain this elastomeric behavior, the perfluoroelastomer is substantially free from fibrous filler, such as that previously used in perfluoroelastomer formulations designed for oil production applications.

For those applications in which temperatures greater than about 400° F. will be encountered, Kalrez® perfluoroelastomers exhibit exceptional stability, and better long term performance than other commercial perfluoroelastomers. These materials are accordingly preferred.

Particularly for those applications in which unusually high temperatures are encountered or in applications where exceptional protection in the event of fire is desired, the fluoropolymer used for either or both of the spacers and the adaptors is intimately at admixed with about from 1–50 wt. % fibrous filler, and preferably at least about 10 wt. % fibrous filler, and especially at least about 20 wt. % of the fibrous filler. The weight percent is based on the total weight of fluoropolymer and filler.

Fillers which can be beneficially used include glass, graphite and carbon fiber, of which carbon fiber is preferred. Such materials, with about 20 wt. % of admixed carbon fiber filler, are commercially available from the DuPont Company as Zymaxx™ Chemical & Creep Resistant Parts. Representative of such materials and their preparation are described in Mansure, U.S. Pat. No. 4,163,742 and Michel, U.S. Pat. No. 4,414,356, both of which are hereby incorporated by reference. These materials can be prepared by the process described in Michel, U.S. Pat. No. 4,422,992, which is also hereby incorporated by reference.

The filled fluoropolymer resins exhibit a particularly desirable combination of physical and mechanical properties. The combination of fluoropolymer resin and fiber filler, and especially carbon fiber filler, not only resists particularly high temperatures in normal operating environments, but, in the event of fire, the fiber filler and the resin matrix provide a sealing function that exceeds the capability of the resin alone.

In a preferred embodiment of the valve packings of the present invention, a ring of flexible graphite is included on the atmospheric side of the female adapter, shown as element 7 in FIGS. 1 and 2. Flexible graphites which can be used include that commercially available from Union Carbide Corporation as Graphoil®. This flexible graphite provides the further improvement of a sealing effect when the packings are exposed to exceptionally high temperatures, as in the case of fire. The flexible graphite, in conjunction with the fibers from the composite, forms a seal between the stem and the valve body, even above temperatures at which the seal element itself is subsequently destroyed.

The configuration of the present packings will, of course, vary with the particular stem which is to be sealed and the associated cavity. Typically, the valve stems to be sealed have an outer diameter of ¼ to 1 ½ inch, which corresponds to the inner diameter of the packing. The diameter of the cavity in which the stem is located, corresponding to the outer diameter of the packing, is generally about from 1 ½ to 2 times the diameter of the stem.

The packings which are used in the valves of the present invention provide a marked improvement in sealing performance over standard fluoropolymer or flexible graphite packings that have heretofore been used. This is particularly advantageous in industrial chemical equipment, where the emissions of toxic or corrosive fluids such as benzene, butadiene and other carcinogenic or toxic substances can be reduced to less than 500 ppm. In many cases, emissions can be reduced to less than 10 ppm or substantially eliminated.

The present invention is further illustrated by the following specific examples, in which parts and percentages are by weight unless otherwise indicated.

EXAMPLES 1–3

In Examples 1–3, valve packings were assembled substantially as illustrated in FIG. 1, to fit valves having a ⅜-inch stem, but without flexible graphite ring 7. In each packing, the male and female adapters, as well as the spacer, were prepared from Teflon® TFE fluoropolymer resin, and the two chevron seal rings were prepared from Kalrez® 3018 perfluoroelastomer compound. The outer diameter of the packing components was 0.873 inch. The spacer and the perfluoroelastomer seals were each 0.274 inch thick, the male adapter was 0.184 inch thick, and the female adapter was 0.242 inch thick.

The packings were assembled in valves controlling benzene, butadiene, and butadiene, in Examples 1–3, respectively. The pressure of the systems was maintained at less than about 200 psi in these Examples. The temperatures were less than 350° F. Emission levels were checked for 9 separate readings over an 8 week period, and found to average the following readings:

Example 1—Benzene—5 parts per million

Example 2—Butadiene—7 parts per million

Example 3—Butadiene—19 parts per million

These observed emissions reflect varying background hydrocarbon levels and indicated no emissions, consistent with the results reported in Examples 4–7 below.

EXAMPLE 4

A rising stem valve having a 0.375 inch diameter stem was assembled substantially as shown in FIG. 3, except that instead of internal spring 36 the valve had external live loading, with 10 Belleville spring washers. The stem was sealed using a five piece stem packing, as shown in FIG. 1. The valve was pressurized with methane to a pressure of 300 psig and tested for leaks using a Foxboro 128 Organic Vapor Analyzer. The valve was cycled repeatedly, and tested for leakage at several intervals, including after three 2-hour periods of 450° F. The results are summarized in the following Table I:

TABLE I

| Temperature °F. | Leakage PPM-Methane | Mechanical Cycles |
|---|---|---|
| 70 | 0 | 50 |
| 450 (2 hr hold) | — | 1,991 |
| 68 | 0 | 5,085 |
| 68 | 0 | 33,289 |
| 450 (2 hr hold) | — | 35,622 |
| 69 | 0 | 39,334 |
| 70 | 0 | 66,277 |
| 450 (2 hr hold) | — | 68,332 |
| 68 | 0 | 78,182 |
| 70 | 0 | 135,509 |
| 67 | 0 | 151,274 |
| 68 | 0 | 200,377 |

As can be seen from the data presented, the valve exhibited no detectable leakage in parts per million after over 200,000 mechanical cycles.

EXAMPLE 5

The general procedure of Example 4 was repeated, using a Fisher control 3" V500 rotary valve having a 1" diameter stem. The valve was externally live loaded with 7 Belleville spring washers. The packing was lubricated with Krytox® GPL 206 fluorinated lubricant. The valve was tested for methane leakage as before, except the methane was at a pressure of 750 psig, and 5000 full stroke cycles were completed during each of the three thermal cycles at 450° F. During the course of testing, the valve was operated 5 cycles per minute.

After 25,000 mechanical cycles, the valve exhibited no detectable leakage in parts per million. The test results are summarized in the following Table II:

TABLE II

| Temperature °F. | Leakage PPM-Methane | Mechanical Cycles |
| --- | --- | --- |
| 74 | 0 | 50 |
| 450 (17 hr hold) | — | 703 |
| 450 | — | 5,813 |
| 73 | 0 | 7,022 |
| 450 (17 hr hold) | — | 8,143 |
| 450 | — | 13,162 |
| 75 | 0 | 16,334 |
| 450 (17 hr hold) | — | 17,574 |
| 450 | — | 22,591 |
| 74 | 0 | 25,000 |

EXAMPLE 6

The general procedure of Example 5 was repeated except that the valve stem packing had only a single seal ring and the male and female adapters. The packing was inverted, with the chevron pointing away from the atmospheric end. The valve was tested for leakage using helium. The bonnet of the valve was covered with a helium-filled plastic bag and the valve body was connected to a helium detector. The results are summarized in Table III below:

TABLE III

| Temperature °F. | Leakage - std. c.c./sec. Helium | Mechanical Cycles |
| --- | --- | --- |
| 75 | $5 \times 10^{-9}$ No helium in bag | 0 |
| 75 | $6.2 \times 10^{-9}$ No helium in bag | 168 |
| 75 | $7.3 \times 10^{-9}$ Static - After 1 hour With helium in bag | 168 |
| 75 | $1.2 \times 10^{-8}$ Cycling at 5 c.p.m. | 252 |

EXAMPLE 7

The general procedure of Example 6 was repeated, and the valve tested for leaks of methane and helium. The methane was measured using a Foxboro 128 OVA while the helium leakage was measured using a Varian 938-41 detector.

The results are summarized in Table IV below:

TABLE IV

| Temperature °F. | Leakage PPM - Methane | Mechanical Cycles |
| --- | --- | --- |
| 76 | 0 | 50 |
| 450 (17 hr hold) | — | 984 |
| 450 | — | 6,008 |
| 78 | 0 | 8,453 |
| 450 (17 hr hold) | — | 9,431 |
| 450 | — | 14,524 |
| 75 | 0 | 16,903 |
| 450 (17 hr hold) | — | 17,814 |
| 450 | — | 22,842 |
| 73 | 0 | 25,074 |

TABLE IV-continued

| Temperature °F. | Leakage - STD cc/sec Helium | Mechanical Cycles |
| --- | --- | --- |
| 73 | Background $1.6 \times 10^{-7}$ Reading - No Change After 24 Hours | 25,174 |
| 72 | Background $2 \times 10^{-7}$ Reading - $4.2 \times 10^{-7}$ After 48 Hours | 25,324 |
| 75 | Background $1.8 \times 10^{-7}$ Reading - $3 \times 10^{-7}$ | 25,324 |

The test results in Examples 4–7 indicate leakage control comparable to that obtained using a metal bellows, with performance substantially longer than that realized using metal bellows, and without the possibility of catastrophic failure of the packing in the valve.

EXAMPLE 8

Valve packings were assembled substantially as illustrated in FIG. 1, but without flexible graphite ring 7, to fit valves having a ⅛-inch stem. In each packing, the male and female adapters as well as the spacer, were prepared from Teflon® fluoropolymer admixed with 20 wt. % carbon-fiber, and available from the DuPont Company as Zymaxx™ components, Teflon® PFA fluoropolymer. The two chevron seal rings were prepared from Kalrez® 3018 perfluoroelastomer compound. The outer diameter of the packing components was 0.873 inch. The spacer and the perfluoroelastomer seals were each 0.274 inch thick, the male adapter was 0.184 inch thick, and the female adapter was 0.242 inch thick.

If the packings were assembled in valves controlling benzene and butadiene in systems in which the pressures are up to about 200 psi and the temperatures are up to 500° F., emission levels over an 8 week period would average less than 20 parts per million for either benzene or butadiene. In addition, the packings will exhibit low creep and cold flow, and low compressibility.

EXAMPLE 9

A valve packing was assembled substantially as in Example 8, except that a further ring of Graphoil® flexible graphite, having a thickness of 0.250 inch, was included on top of the female adapter. The valve packing was assembled in a valve, and tested in a fire certification test.

The pressure of the line controlled by the valve during the test averaged 200 psi, with a minimum pressure of 195 psi and a maximum pressure of 222 psi. The fluid in the line was hot water and steam.

The valve was exposed to three natural gas burner flames in a test chamber for a total test period of 30 minutes. The test elevated the temperature of the valve body to 1245° F. within 12 minutes, 50 seconds, and to 1430° F. at the end of the test. The test elevated the temperature of the packing to 1200° F. within 12 minutes, 50 seconds, and to 1383° F. at the end of the test.

The valve was tested for leaks after the flame test, at a low pressure of about 30 psig. The valve exhibited a leakage of 3.4 m/min. American Petroleum Institute (API) #607 Fire Test permits 20 ml/min.

The valve was tested for leaks after the flame test, at a high pressure of about 200 psig. The valve exhibited a leakage of 8.7 ml/min. API standards permit 200 ml/min.

No external leakage was noted during either the course of the test or cool down after the test. API standards permit 100 ml/min.

We claim:

1. In a valve having a body, an adjusting stem within the body and a packing around the stem, the improvement wherein the packing consists of a plurality of individual rings including
   (a) a male adapter,
   (b) a female adapter, and
   (c) one chevron seal ring consisting essentially of perfluoroelastomer positioned between the male adapter and the female adapter, the chevron seal ring being pointed toward the atmospheric end of the packing, the male and female adapters consisting essentially of polymeric resins stable at high temperature selected from the group consisting of a substantially non-elastomeric fluoropolymer and a polyetheretherketone, the chevron seal ring disposed between and contacting the male and female adapters, and the packing having an improved sealing performance such that emissions are reduced to less than 500 parts per million.

2. A valve of claim 1 wherein the perfluoroelastomer is substantially free from fibrous filler and has an elongation at break of at least about 100%.

3. A valve of claim 1 wherein the male and female adapters further comprise about from 1 to 50 wt. % of fibrous filler intimately admixed therewith.

4. A valve of claim 3 wherein the fibrous filler is selected from carbon, graphite and glass.

5. A valve of claim 4 wherein the fibrous filler comprises at least about 10 wt. % of the polymeric resin.

6. A valve of claim 5 wherein the fibrous filler comprises at least 20 wt. % of the polymeric resin.

7. A valve of claim 3 wherein the male and female adapters consist essentially of a substantially non-elastomeric fluoropolymer.

8. A valve packing comprising a plurality of rings including
   (a) a male adapter,
   (b) a female adapter, and
   (c) at least one chevron seal ring consisting essentially of perfluoroelastomer positioned between the male adapter and the female adapter, each such perfluoroelastomer chevron seal ring being pointed toward the atmospheric end of the packing, the male and female adapters consisting essentially of polymeric resins stable at high temperature selected from the group consisting of a substantially non-elastomeric fluoropolymer and a polyetheretherketone, and the packing having an improved sealing performance such that emissions are reduced to less than 500 parts per million.

9. A valve packing of claim 8 wherein the perfluoroelastomer is substantially free from fibrous filler and has an elongation at break of at least about 100%.

10. A valve packing of claim 8 wherein the male and female adapters are formed from a substantially non-elastomeric fluoropolymer.

11. A valve packing of claim 8 wherein the male and female adapters further comprise about from 1 to 50 wt. % of fibrous filler intimately admixed therewith.

12. A valve packing of claim 11 wherein the fibrous filler is selected from carbon, graphite and glass.

13. A valve packing of claim 12 wherein the fibrous filler comprises at least about 10 wt. % of the polymeric resin.

14. A valve packing of claim 12 wherein the fibrous filler comprises at least 20 wt. % of the polymeric resin.

* * * * *